(12) United States Patent
Bernstein

(10) Patent No.: US 8,390,597 B2
(45) Date of Patent: Mar. 5, 2013

(54) CAPACITIVE SENSOR PANEL HAVING DYNAMICALLY RECONFIGURABLE SENSOR SIZE AND SHAPE

(75) Inventor: Jeffrey Traer Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/290,939

(22) Filed: Nov. 7, 2011

(65) Prior Publication Data

US 2012/0050333 A1    Mar. 1, 2012

Related U.S. Application Data

(62) Division of application No. 12/140,923, filed on Jun. 17, 2008, now Pat. No. 8,054,300.

(51) Int. Cl.
*G06F 3/045* (2006.01)

(52) U.S. Cl. .................................. 345/174; 178/18.06

(58) Field of Classification Search .................. 345/173, 345/174; 178/18.01–18.09, 18.11
See application file for complete search history.

(56) References Cited

U.S. PATENT DOCUMENTS

| | | | |
|---|---|---|---|
| 5,374,787 A | 12/1994 | Miller et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,054,300 B2 | 11/2011 | Bernstein | |
| 2004/0252109 A1 | 12/2004 | Trent et al. | |
| 2005/0104867 A1 | 5/2005 | Westerman et al. | |
| 2006/0026521 A1 | 2/2006 | Hotelling et al. | |
| 2006/0097991 A1 | 5/2006 | Hotelling et al. | |
| 2006/0161870 A1 | 7/2006 | Hotelling et al. | |
| 2006/0197753 A1 | 9/2006 | Hotelling | |
| 2008/0122798 A1 | 5/2008 | Koshiyama et al. | |
| 2008/0158172 A1 | 7/2008 | Hotelling | |
| 2009/0309851 A1 | 12/2009 | Bernstein | |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Anonymous. (Apr. 13, 2004). Proximity Sensor Demo Kit, User Guide, Version 0.62—Preliminary, Integration Associates, Inc., 14 pages.

Lee et al., "A Multi-Touch Three Dimensional Touch-Sensitive Tablet," ACM, Apr. 1985, pp. 21-25.

Non-Final Office Action mailed May 16, 2011, for U.S. Appl. No. 12/140,923, filed Jun. 17, 2008, eight pages.

Notice of Allowance mailed May 16, 2011, for U.S. Appl. No. 12/140,923, filed Jun. 17, 2008, seven pages.

(Continued)

*Primary Examiner* — Stephen Sherman
(74) *Attorney, Agent, or Firm* — Morrison & Foerster LLP

(57) ABSTRACT

This relates to a capacitive sensor panel that is able to dynamically reconfigure its sensor size and shape for proximity and/or distance to enable hover and gesture detection. Thus, the size and/or shape of the sensors in the panel can differ according to present needs. The sensor panel may dynamically reconfigure its sensor size and shape based on an object's proximity to the panel. The sensor panel may dynamically reconfigure its sensor size and shape based on a gesture detected by the panel. The sensor panel may dynamically reconfigure its sensor size and shape based on an application executing on a device in communication with the panel.

15 Claims, 18 Drawing Sheets

OTHER PUBLICATIONS

Rekimoto "SmartSkin: An Infrastructure for Freehand Manipulation on Interactive Surfaces," CHI 2002.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

U.S. Appl. No. 11/818,477, filed Jun. 13, 2007, by Westerman et al. (copy not attached.).

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Zimmerman et al., "Applying Electric Field Sensing to Human-Computer Interfaces," IEEE Sig., CHI, May 1995.

CAPACITIVE SENSOR PANEL HAVING DYNAMICALLY RECONFIGURABLE SENSOR SIZE AND SHAPE

CROSS-REFERENCE TO RELATED APPLICATIONS

This application is a divisional of U.S. patent application Ser. No. 12/140,923 filed Jun. 17, 2008, the entire disclosure of which is incorporated herein by reference.

FIELD OF THE INVENTION

This relates to capacitive sensor panels, and more particularly to capacitive sensor panels having dynamically reconfigurable sensor size and shape for proximity and/or distance to enable hover and gesture detection.

BACKGROUND OF THE INVENTION

Many types of input devices are presently available for performing operations in a computing system, such as buttons or keys, mice, trackballs, joysticks, touch sensor panels, touch screens and the like. Touch sensor panels and touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch sensor panels and touch screens can recognize a touch event and the position of the touch event on the touch sensor panel, and the computing system can then interpret the touch event in accordance with the display appearing at the time of the touch event, and thereafter can perform one or more actions based on the touch event.

Capacitive touch sensor panels can be formed from a matrix of drive and sense lines of a substantially transparent conductive material such as Indium Tin Oxide (ITO), often arranged in rows and columns in horizontal and vertical directions on a substantially transparent substrate. U.S. patent application Ser. No. 11/649,998 filed on Jan. 3, 2007 and entitled "Proximity and Multi-Touch Sensor Detection and Demodulation" (also incorporated by reference herein in its entirety) teaches a capacitive touch sensor array of uniform granularity capable of detecting multiple simultaneous touch events and a limited amount of proximity (or hover) events (near-field proximity sensing). In addition, that application discloses a proximity sensor array of fixed granularity capable of detecting multiple simultaneous proximity events (far-field proximity sensing). However, these fixed or uniform granularity proximity sensor arrays are incapable of being selectively configurable in real time to optimize their sensing capabilities, especially with regard to the detection of hovering objects whose distance to the touch sensor panel or touch screen may vary greatly.

SUMMARY OF THE INVENTION

This relates to a capacitive sensor panel that is able to dynamically reconfigure its sensor size and shape for proximity and/or distance to enable hover and gesture detection. Thus, the size and/or shape of the sensors in the panel can differ according to present needs. Hover and gesture detection may become more effective and efficient.

In some embodiments, a sensor panel may dynamically reconfigure its sensor size and shape based on an object's proximity to the panel. The sensors may have an initial size and shape. When the sensors sense an object, a determination may be made as to whether the object is within a certain distance of the panel. If so, the size and/or shape of the sensors in the panel may be dynamically reconfigured accordingly.

In some embodiments, a sensor panel may dynamically reconfigure its sensor size and shape based on a gesture detected by the panel. The sensors may have an initial size and shape. When the sensors sense a touch or proximity event, the event may be recognized as a gesture. Based upon recognized characteristics of the gesture, the size and/or shape of the sensors in the panel may be dynamically reconfigured.

In some embodiments, a sensor panel may dynamically reconfigure its sensor size and shape based on an application executing on a device in communication with the panel. The sensors may have an initial size and shape. When the device selects an application to execute, the application may have functions which require certain gestures from a user in order to interact with the application. Accordingly, the size and/or shape of the sensors in the panel may be dynamically reconfigured for the selected application based on the expected gestures.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the invention.

This relates to multi-touch, single-touch and proximity capacitive sensor panels having dynamically reconfigurable sensor size and shape for proximity and/or distance to enable hover and gesture detection. The sensor panel can be dynamically configured to vary its sensor size and shape and enable the detection of non-contact proximity (or hover) events and gestures at various distances from the sensor panel. This capability can provide a new suite of non-contact gestures and features for enhanced user interaction.

Although embodiments of this invention may be described herein primarily in terms of devices utilizing mutual capacitance based multi-touch technologies, it should be understood that the invention is not limited to such devices, but is generally applicable to devices utilizing other touch and proximity sensing technologies as well, including but not limited to self capacitance sensing.

Figure 1:
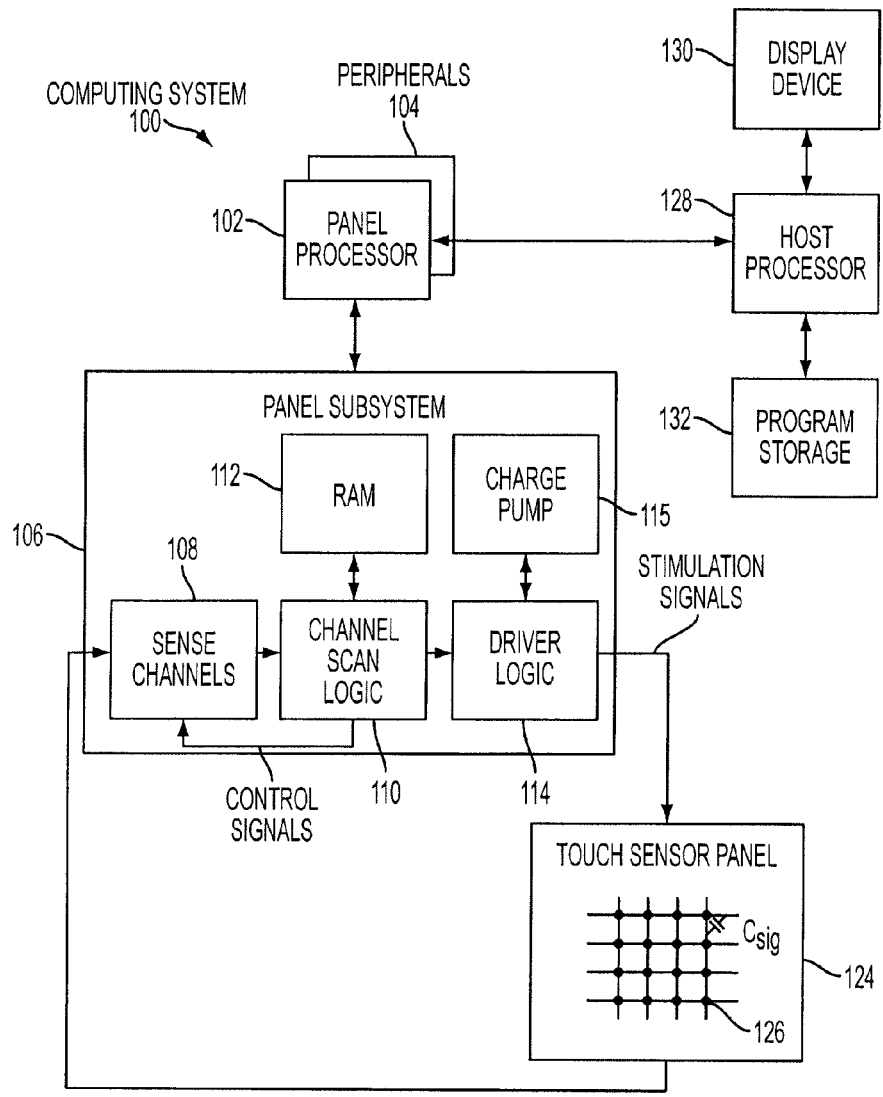
FIG. 1 illustrates an exemplary computing system including a capacitive sensor panel having dynamically reconfigurable sensor size and shape according to embodiments of the invention.

FIG. 1 illustrates exemplary computing system 100 that can include one or more of the embodiments of the invention described herein. Computing system 100 can include one or more panel processors 102 and peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic 110 and driver logic 114. Channel scan logic 110 can access RAM 112, autonomously read data from the sense channels and provide control for the sense channels. In addition, channel scan logic 110 can control driver logic 114 to generate stimulation signals 116 at various frequencies and phases that can be selectively applied to drive lines of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media can also be used. Either or both of the drive and sense lines can be used to provide dynamically reconfigurable sensor size and shape of touch sensor panel 124 according to embodiments of the invention. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 124 can drive sense channel 108 in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form touch screen 118.

Note that one or more of the functions described above can be performed by firmware stored in memory (e.g. one of the peripherals 104 in FIG. 1) and executed by panel processor 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 1, but may be a proximity sensor panel or any other sensor panel capable of sensing a touch event, a proximity event, or a gesture and having dynamically reconfigurable sensor size and shape according to embodiments of the invention.

Figure 2:
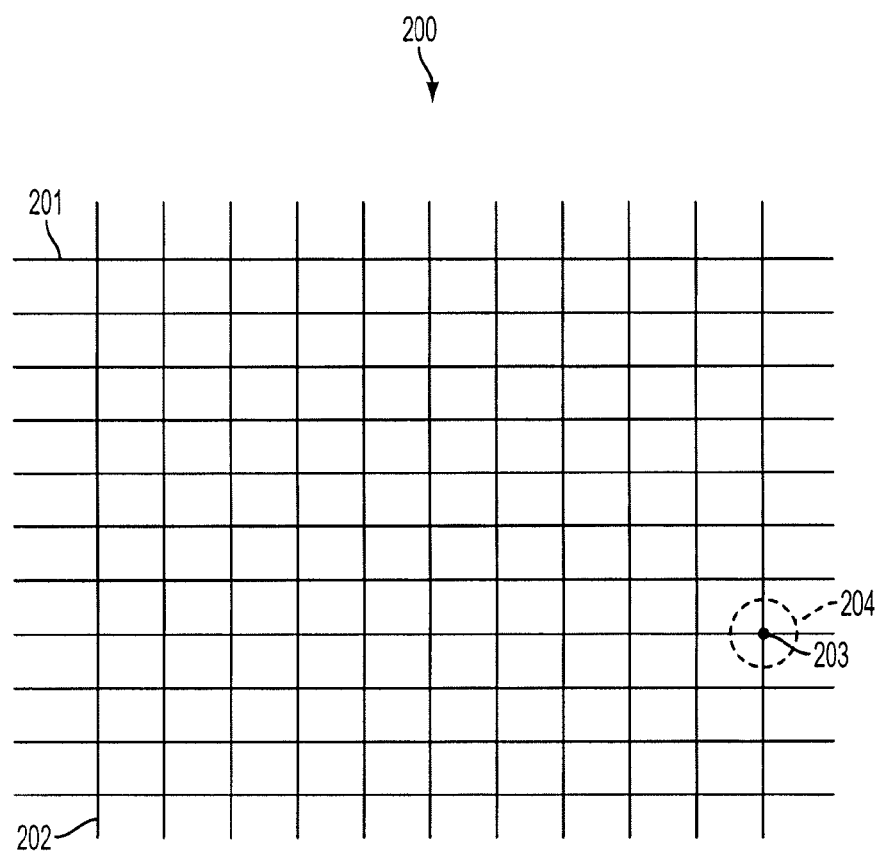
FIG. 2 illustrates an exemplary capacitive sensor panel according to embodiments of the invention.

FIG. 2 illustrates an exemplary capacitive sensor panel. In the example of FIG. 2, in capacitive sensor panel 200, as an object approaches a touch-sensitive surface of the panel, a small capacitance forms between the object and sensing pixels 203 in proximity to the object. By detecting changes in capacitance at each of sensing pixels 203 caused by this small capacitance, and by noting the position of the sensing pixels, a sensing circuit (not shown) can detect and monitor multiple touch events, proximity events, and gestures and generate an image of touch. The capacitive sensing pixels 203 may be based on self capacitance or mutual capacitance.

In a self capacitance sensor panel, the self capacitance of a sensing pixel can be measured relative to some reference, e.g., ground. Sensing pixels 203 may be spatially separated electrodes. Each electrode can define a sensing pixel. These electrodes can be coupled to driving circuitry via by conductive traces 201 (drive lines) and to sensing circuitry by conductive traces 202 (sense lines). In some self capacitance embodiments, a single conductive trace to each electrode may be used as both a drive and sense line. Touch events, proximity events, or gestures can be detected at a sensor pixel by measuring changes in the capacitance of the electrode associated with the pixel.

In a mutual capacitance sensor panel, the mutual capacitance of a sensing pixel can be measured between two conductors. Sensing pixels 203 may be formed by the crossings of patterned conductors forming spatially separated lines—drive lines 201 and sense lines 202. Driving circuitry may be coupled to drive lines 201 and sensing circuitry to sense lines 202. Drive lines 201 may be formed on a first layer and sense lines 202 may be formed on a second layer, such that the drive and sense lines cross or "intersect" one another at sensing pixels 203. The different layers may be different substrates, different sides of the same substrate, or the same side of a substrate with some dielectric separation. Each intersection of a drive line and a sense line can define a sensing pixel.

Touch events, proximity events, or gestures can be detected at a sensor pixel by measuring changes in the capacitance between the drive and sense lines associated with the pixel. In some embodiments, changes in other capacitances (e.g., between a sense line and a back plate) can also be measured to detect touch events, proximity events, or gestures.

The arrangement of drive and sense lines can vary. For example, in a Cartesian coordinate system (as shown in FIG. 2), the drive lines may be formed as horizontal rows, while the sense lines may be formed as vertical columns (or vice versa), thereby forming a plurality of pixels that may be considered as having distinct x and y coordinates. Alternatively, in a polar coordinate system, the sense lines may be a plurality of concentric circles with the drive lines being radially extending lines (or vice versa), thereby forming a plurality of pixels that may be considered as having distinct radius and angle coordinates. In either case, drive lines 201 may be connected to drive circuitry, and sense lines 202 may be connected to sensing circuitry.

In some embodiments, drive lines 201 can be driven one at a time, while the other drive lines are grounded. This process can be repeated for each drive line 201 until all the drive lines have been driven, and an image (based on capacitance) can be built from the sensed results. Once all the lines 201 have been driven, the sequence can repeat to build a series of images. Alternatively, multiple drive lines 201 may be driven substantially simultaneously or nearly simultaneously.

Each sensing pixel can be associated with an area for which the sensing pixel is intended to detect touch events, proximity events, or gestures. For example, sensing pixel 203 can be associated with area 204. Area 204 can be referred to as the size and/or shape of the sensing pixel. The size of a sensing pixel can depend on the overall granularity (or density) of sensing pixels. For example, a high granularity can imply a higher number of sensing pixels in a given area and thus a smaller size for each sensing pixel. The shape of a sensing pixel can depend on the overall layout of the sensing pixels. For example, an 8-neighbor layout can imply a square or circular shape for each sensing pixel.

A smaller size and/or a particular shape can be beneficial to detect the position of a touch event, a proximity event, or a gesture with higher precision. A larger size and/or a particular shape can be beneficial to detect the general position of a touch event, a proximity event, or a gesture when higher precision may not be necessary. Therefore, dynamically reconfiguring the size and shape of the pixels as needed can provide a more efficient sensor panel.

Different characteristics of an object can result in different requirements as to the size and shape of pixels in sensor panels. Different applications can also have different requirements as to the size and shape of pixels in sensor panels based on the characteristics of an object expected to interact with the panels. Exemplary objects include a hand, a finger, a stylus, an optical pointer, and like objects capable of touching or being proximate to a sensor panel and targeting a portion of the panel. Exemplary object characteristics include parallel (x, y) and perpendicular (z) positions, velocities, and motion relative to the panel. These will be discussed below in more detail with regard to FIGS. 9-12.

Figure 3A:
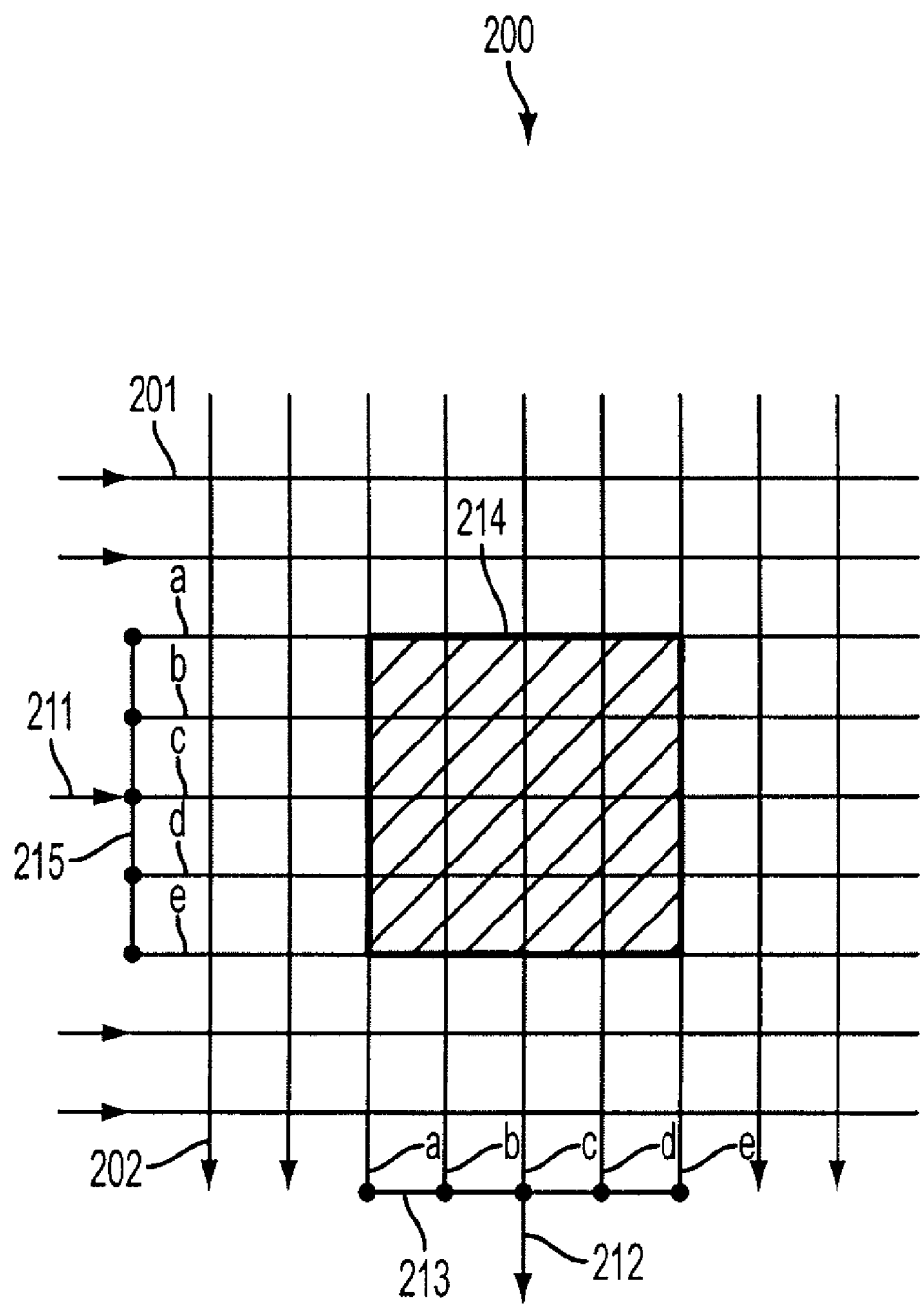
FIG. 3a illustrates an exemplary mutual capacitance scheme for dynamically reconfiguring sensor size and shape using intersecting composite drive lines and sense lines to form a composite electrode according to embodiments of the invention.

FIG. 3a illustrates an exemplary mutual capacitance scheme for dynamically reconfiguring sensor size and shape using intersecting composite drive lines and composite sense lines to form a composite electrode according to embodiments of the invention. In the example of FIG. 3a, sensor panel 200 may include drive lines 201 and sense lines 202. Drive lines 201 may intersect sense lines 202. Drive lines 201a-e can be connected to each other through switches 215, illustrated symbolically in FIG. 3a. Note that switches 215, although drawn adjacent to sensor panel 200 in FIG. 3a, can be located on a separate panel subsystem as shown in FIG. 1. Thus, drive lines 201a-e can form a composite drive line 211 that can simultaneously or nearly simultaneously send a drive signal to all the pixels defined by lines 201a-e. Similarly, sense lines 202a-e can be connected to each other through switches 213, illustrated symbolically in FIG. 3a. Thus, sense lines 202a-e can form a composite sense line 212 that can send a combined sense signal from all the pixels defined by lines 202a-e. The intersecting pixels of composite drive line 211 and composite sense line 212 can form composite electrode 214 as a single pixel, illustrated by the shaded region in FIG. 3a. The sensing circuitry can only sense the total capacitance of these pixels in composite electrode 214 and not their individual capacitances. In essence, what were individual pixels are now connected to form a single pixel. As a result, the pixel size and shape of sensor panel 200 may be reconfigured in this portion of the panel. If the pixel size and shape are to be reconfigured back, one or both of switches 213 and 215 may be disabled.

Figure 3B:
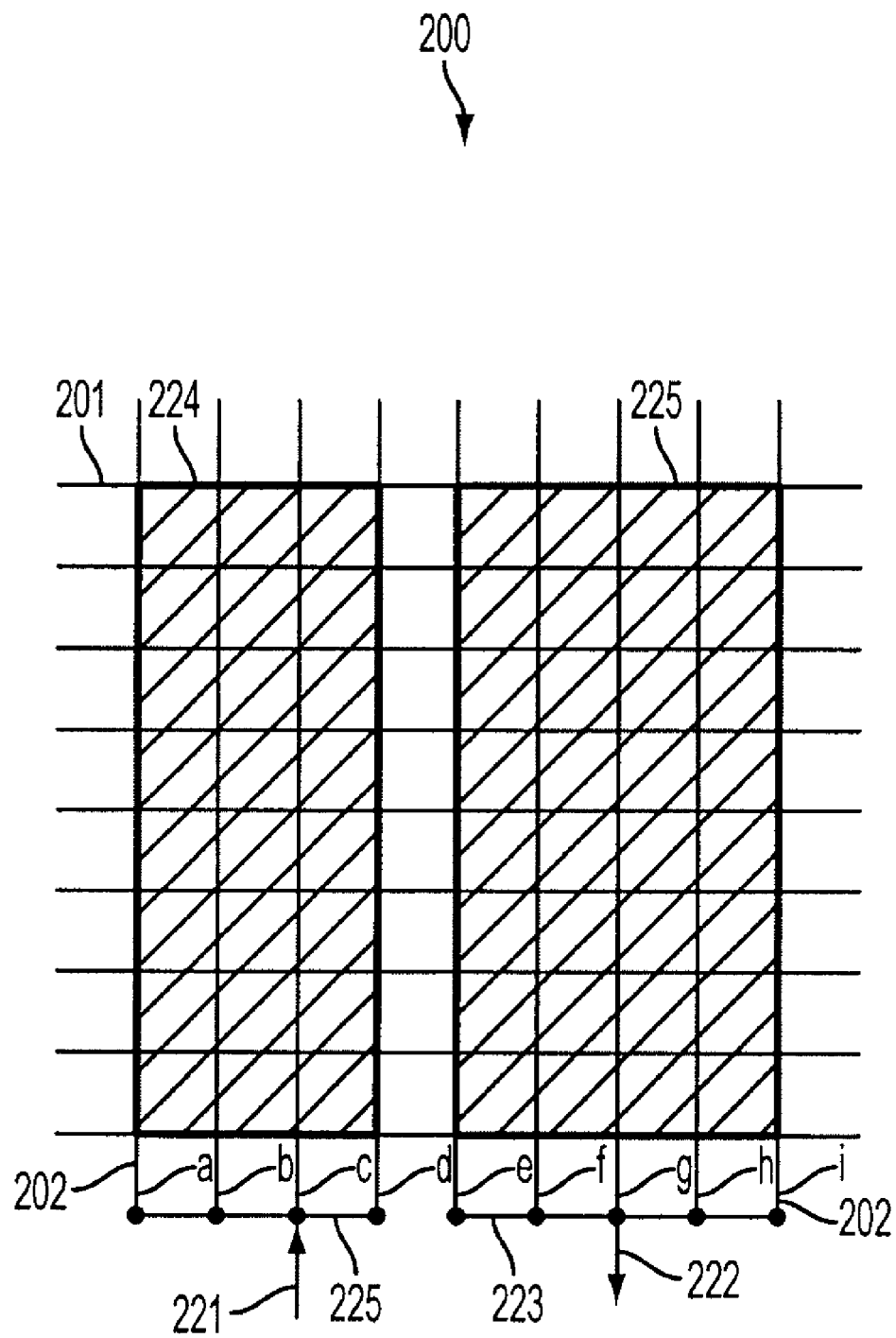
FIG. 3b illustrates an exemplary mutual capacitance scheme for dynamically reconfiguring sensor size and shape using a composite drive electrode formed from one group of parallel sense lines and a composite sense electrode formed from another group of parallel sense lines according to embodiments of the invention.

FIG. 3b illustrates an exemplary mutual capacitance scheme for dynamically reconfiguring sensor size and shape using a composite drive electrode formed from one group of parallel sense lines and a composite sense electrode formed from another group of parallel sense lines according to embodiments of the invention. In the example of FIG. 3b, all of sense lines 202a-d can be connected to each other through switches 225 (illustrated symbolically in FIG. 3b) to form composite drive electrode 224, illustrated by the left shaded region in FIG. 3b. Note that switches 225, although drawn adjacent to sensor panel 200 in FIG. 3b, can be located on a separate panel subsystem as shown in FIG. 1. In this embodiment, composite drive electrode 224 can be created by simultaneously or nearly simultaneously sending a drive signal via composite drive line 221 through sense lines 202a-d. Similarly, sense lines 202e-i can be connected to each other through switches 223 (illustrated symbolically in FIG. 3b) for the pixels defined by the intersections of each of drive lines 201 with sense lines 202e-i to form composite sense electrode 225, illustrated by the right shaded region in FIG. 3b. Thus, sense lines 202e-i can form a composite sense line 222 that can send a combined sense signal from all the pixels defined by lines 202e-i.

In summary, in the embodiment of FIG. 3b, the drive lines 201 may not be used, and sense lines 202 may be grouped into composite drive electrode 224 and composite sense electrode 225 located adjacent to each other. The composite drive electrode 224 and sense electrode 225 can form a single mutual capacitance sensor across which fringing electric field lines may be formed when the composite drive electrode 224 is stimulated with a stimulation signal. A finger or other object touching down or hovering over the sensor panel may block some of the electric field lines, resulting in a reduction in the amount of charge coupled across the sensor. This change in coupled charge can then be detected by the sensing circuitry.

As a result, the pixel size and shape of sensor panel 200 may be reconfigured in these portions of the panel. If the pixel size and shape are to be reconfigured back, one or both of switches 223 and 225 may be disabled.

Figure 4A:
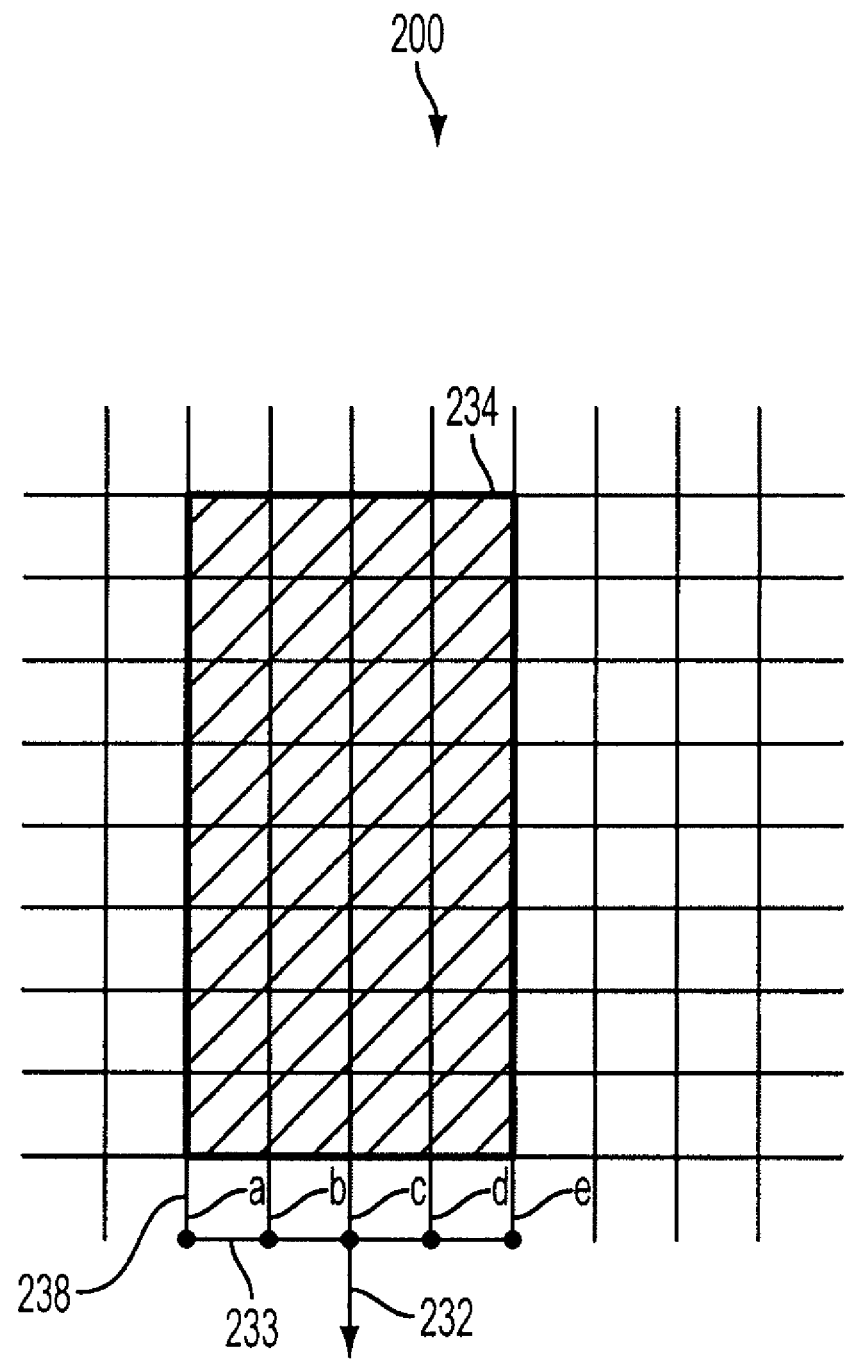
FIG. 4a illustrates an exemplary self capacitance scheme for dynamically reconfiguring sensor size and shape using composite columns of electrodes to form a composite electrode according to embodiments of the invention.

FIG. 4a illustrates an exemplary self capacitance scheme for dynamically reconfiguring sensor size and shape using composite columns of electrodes according to embodiments of the invention. In the example of FIG. 4a, sensor panel 200 may include an array of electrodes, where each electrode may be formed at the intersection of a drive and sense line. Columns of electrodes can be connected to each other by configurable switches represented symbolically by conductive lines 238a-e and conductive lines 233 to form composite electrode 234 as a single pixel, illustrated by the shaded region in FIG. 4a. Thus, the electrodes can send a combined sense signal 232 from all the pixels defined by these electrodes. The sensing circuitry can only sense the total capacitance of these pixels in composite electrode 234 and not their individual capacitances. As a result, the pixel size and shape of sensor panel 200 may be reconfigured in this portion of the panel. If the pixel size and shape are to be reconfigured back, one or both of lines 233 and 238 may be disabled.

Figure 4B:
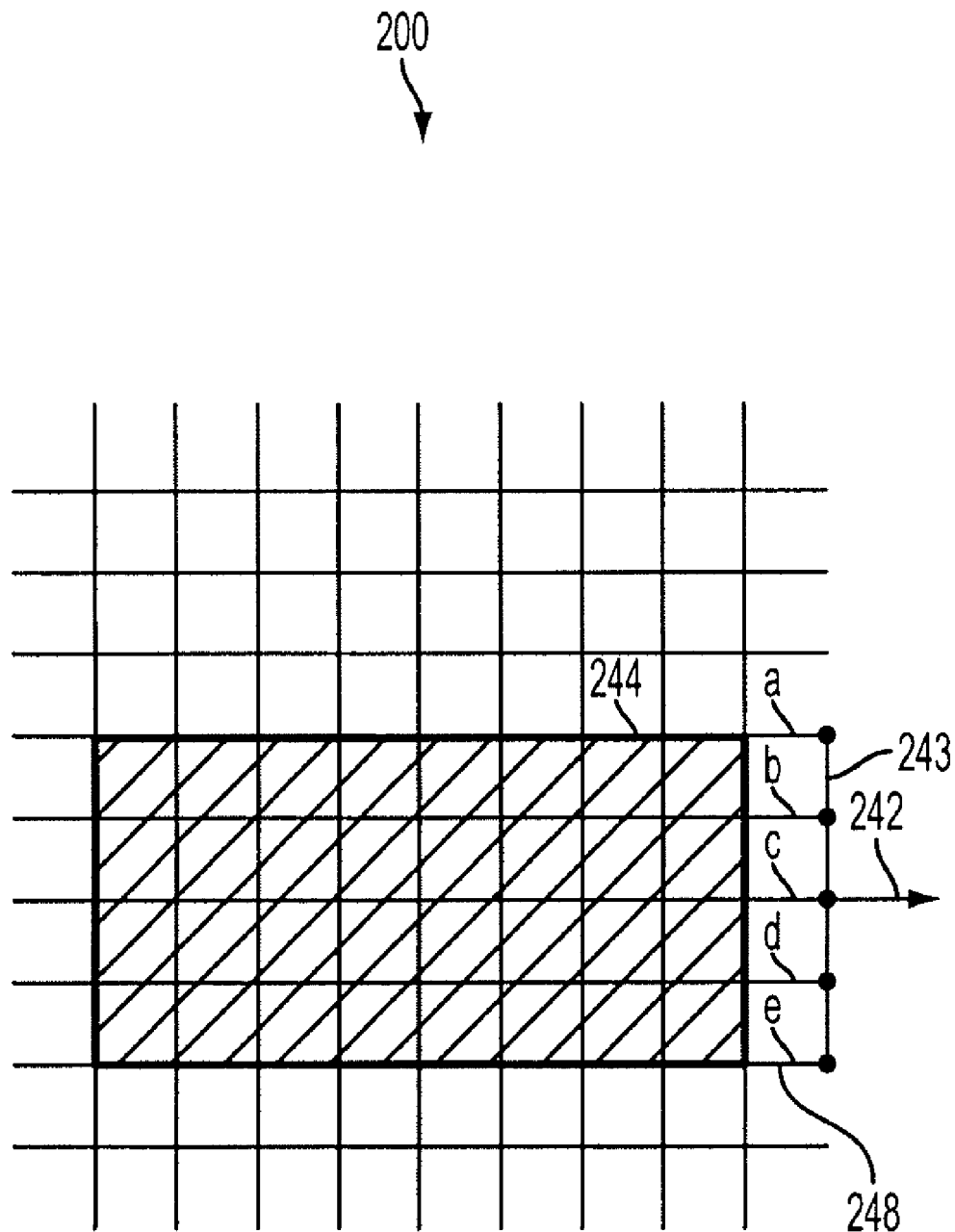
FIG. 4b illustrates an exemplary self capacitance scheme for dynamically reconfiguring sensor size and shape using composite rows of electrodes to form a composite electrode according to embodiments of the invention.

FIG. 4b illustrates an exemplary self capacitance scheme for dynamically reconfiguring sensor size and shape using composite rows of electrodes according to embodiments of the invention. In the example of FIG. 4b, rows of electrodes can be connected to each other by configurable switches represented symbolically by conductive lines 248a-e and conductive lines 243 to form composite electrode 244 as a single pixel, illustrated by the shaded region in FIG. 4b. Thus, the electrodes can send a combined sense signal 242 from all the pixels defined by these electrodes. The sensing circuitry can only sense the total capacitance of these pixels in composite electrode 244 and not their individual capacitances. As a result, the pixel size and shape of sensor panel 200 may be reconfigured in this portion of the panel. If the pixel size and shape are to be reconfigured back, one or both of lines 243 and 248 may be disabled.

Figure 4C:
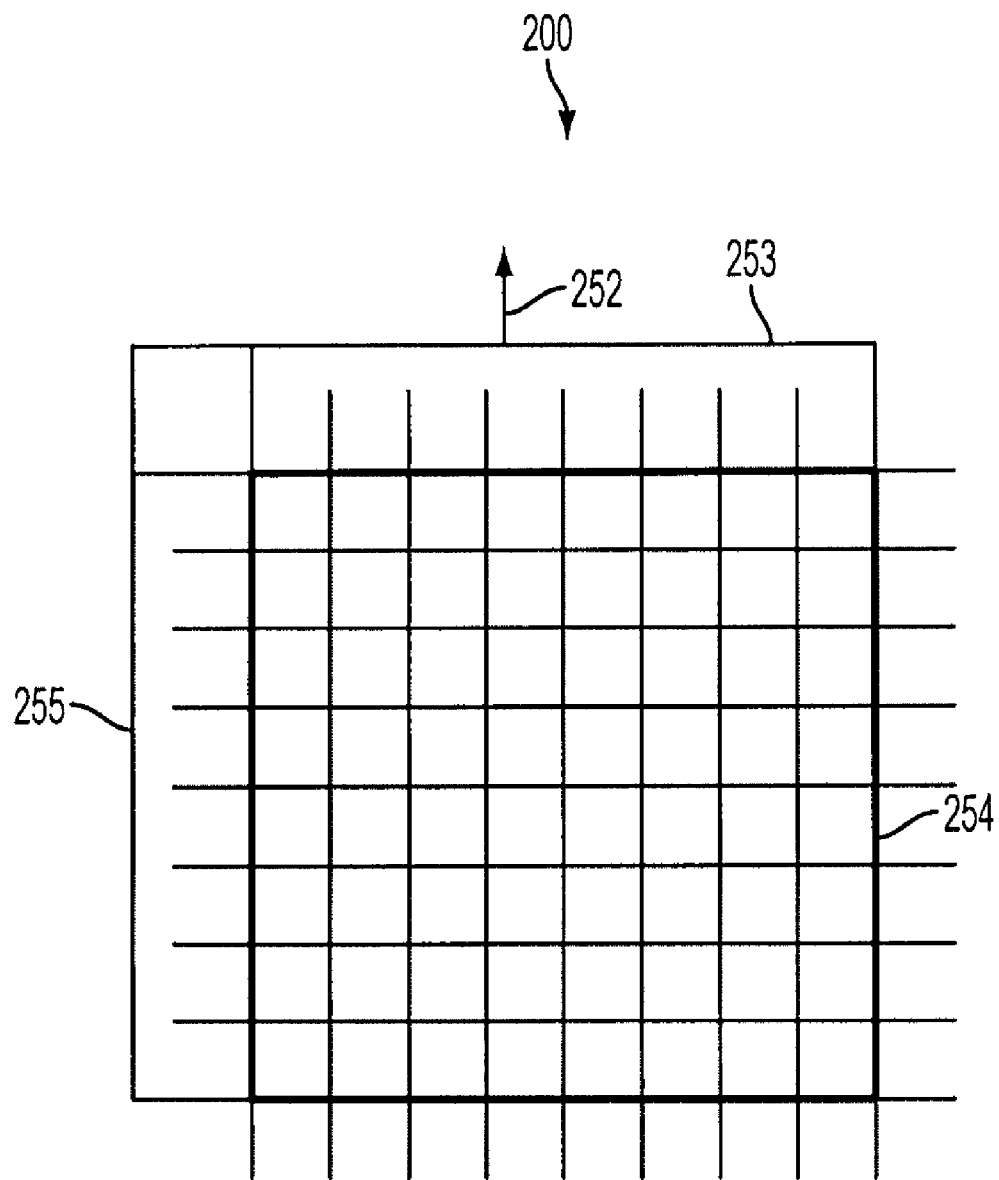
FIG. 4c illustrates an exemplary self capacitance scheme for dynamically reconfiguring sensor size and shape using composite rows and columns of electrodes to form a composite loop electrode according to embodiments of the invention.

FIG. 4c illustrates an exemplary self capacitance scheme for dynamically reconfiguring sensor size and shape using composite loop electrodes according to embodiments of the invention. In the example of FIG. 4c, all of the electrodes in a loop can be connected to each other by configurable switches represented symbolically by conductive lines 253 and 255 that connect their drive and sense lines to form composite loop electrode 254 as a single pixel, illustrated by the heavy line in FIG. 4c. Thus, the electrodes can send a combined sense signal 252 from all the pixels defined by these electrodes. The sensing circuitry can only sense the total capacitance of these pixels in composite electrode 254 and not their individual capacitances. As a result, the pixel size and shape of sensor panel 200 may be increased in this portion of the panel. If the pixel size and shape are to be increased again, one or both of lines 253 and 255 may be disabled.

In some embodiments, the sensor panel may dynamically switch between different mutual capacitance schemes, such as in FIGS. 3a and 3b. This may be accomplished by enabling and disabling the appropriate switches that connect the drive and sense lines involved in forming a particular scheme. Similarly, the sensor panel may dynamically switch between different self capacitance schemes, such as in FIGS. 4a-4c. This may also be accomplished by enabling and disabling the appropriate switches that connect the drives and sense lines involved in forming a particular scheme.

In some embodiments, the sensor panel may dynamically switch between a mutual capacitance scheme, such as in FIGS. 3a and 3b, and a self capacitance scheme, such as in FIGS. 4a-4c. For example, to switch from mutual to self capacitance, a mutual capacitive drive line may switch from a row and a sense line from a column to both connect to a single electrode. Conversely, for example, to switch from self to mutual capacitance, a self capacitance drive line may switch from a single electrode to connect to a row and a sense line from the single electrode to connect to a column.

It is to be understood that the composite electrodes are not limited to the square and rectangular shapes illustrated in FIGS. 3a-4c, but may includes any shapes, either regular or irregular, capable of providing sensor panels according to embodiments of the present invention.

Figure 5:
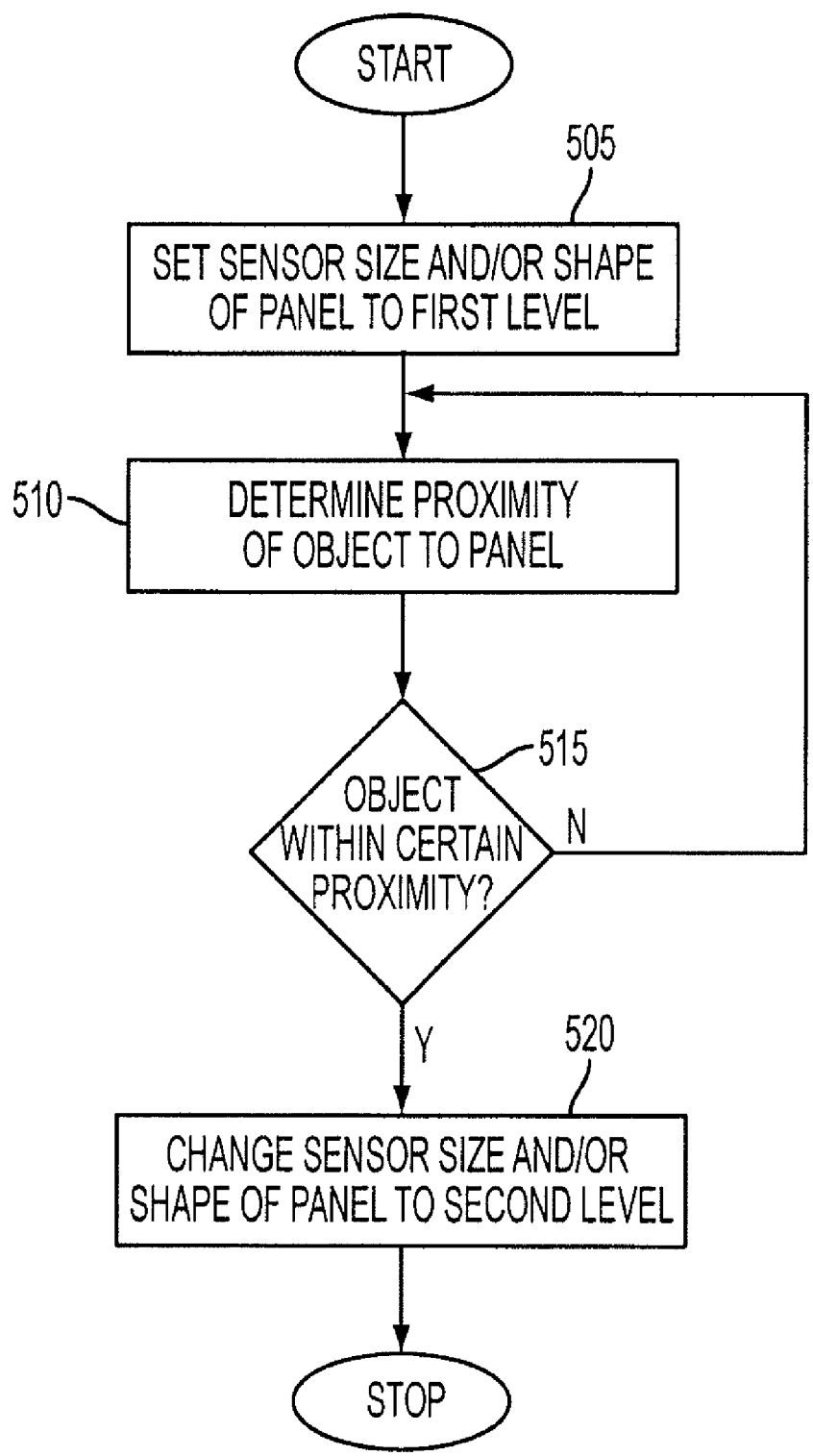
FIG. 5 illustrates an exemplary method for dynamically reconfiguring sensor size and shape of a sensor panel based on an object's proximity to the panel according to embodiments of the invention.

FIG. 5 illustrates an exemplary method for dynamically reconfiguring sensor size and shape of a sensor panel based on an object's proximity to the panel according to embodiments of the invention. Initially, a device having a sensor panel with dynamically reconfigurable sensor size and shape may adjust the sensing pixels to a first size and/or shape (505). The first size may be the maximum defined size of the panel where all of the pixels are interconnected. Alternatively, the first size may be any large size that is still able to detect the presence of an object. The first shape may be any shape that is able to detect the presence of an object. When the pixels sense an object, the device may determine the proximity of the object to the panel based on the pixel signals (510). The device may compare the determined proximity with a predetermined proximity threshold (515). If the object is not yet at a proximity that approximately matches the threshold, the device may continue to monitor the object's proximity to the panel (510, 515). However, if the object is at or below that threshold, the device may dynamically reconfigure the pixels to a second size and/or shape (520). The second size may be the minimum defined size of the panel where none of the pixels are interconnected. Alternately, the second size may be any size sufficiently small enough to detect where the object is targeting on the panel with precision. The second shape may be any shape that is able to detect where the object is targeting on the panel with precision.

Figure 6A:
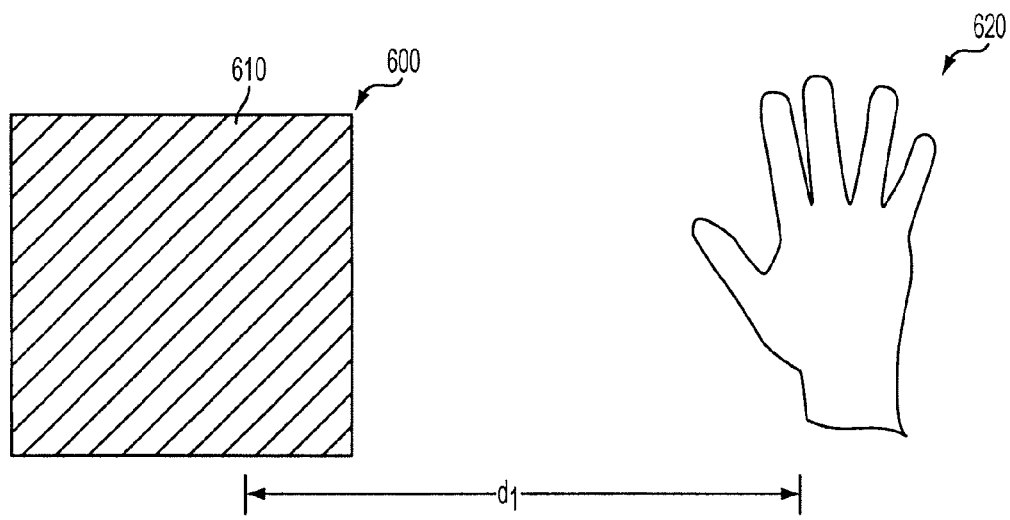
FIGS. 6a, 6b, and 6c are exemplary illustrations of a sensor panel having dynamically reconfigurable sensor size and shape based on an object's proximity to the panel according to embodiments of the invention.
Figure 6B:
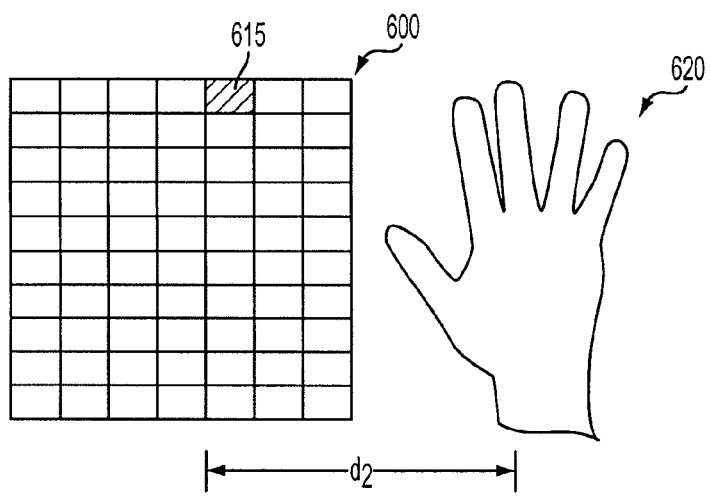
Figure 6C:
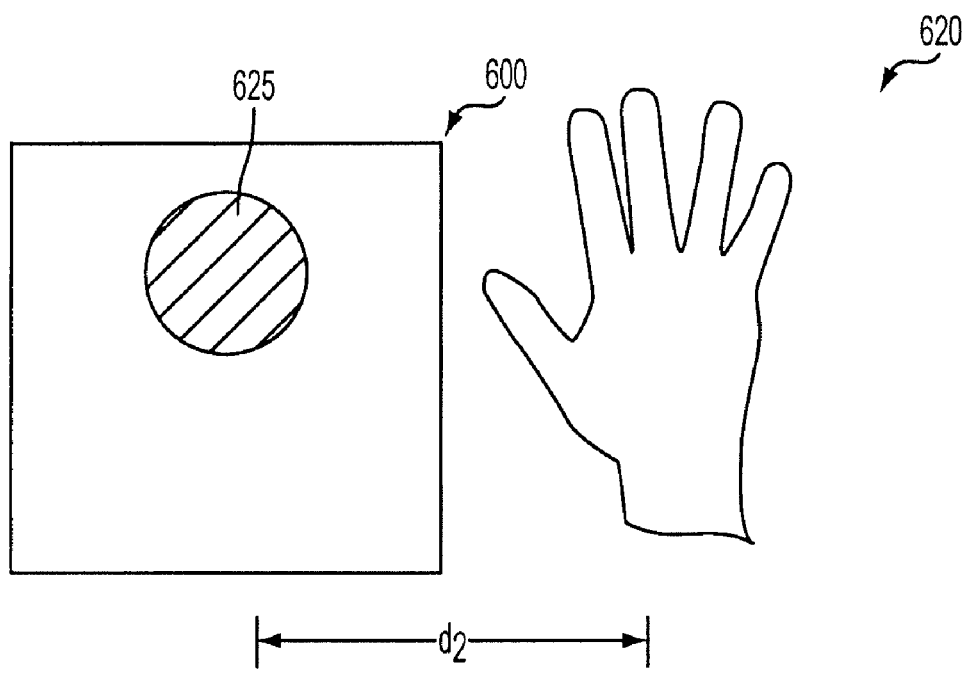

FIGS. 6a, 6b, and 6c are exemplary illustrations of a sensor panel having dynamically reconfigurable sensor size and shape based on an object's proximity to the panel according to embodiments of the invention. FIGS. 6a, 6b, and 6c illustrate the method of FIG. 5. In FIG. 6a, sensor panel 600 of a device may have a larger pixel size and square shape 610 in which all of the pixels are interconnected. Object 620, e.g., a hand, may be a distance $d_1$ from sensor panel 600. As object 620 approaches panel 600, as some point, the panel may detect the object. When panel 600 detects object 620, the device may determine the object's proximity to the panel and continue to do so as the object approaches. Suppose a distance $d_2$ is the predetermined proximity threshold, where $d_2 < d_1$. In FIG. 6b, when object 620 reaches a proximity to panel 600 that approximately matches or falls below the threshold $d_2$, the device may dynamically reconfigure the panel to a smaller pixel size 615 in which none of the pixels are interconnected.

Alternatively, in FIG. 6c, when object 620 reaches a proximity to panel 600 that approximately matches or falls below the threshold $d_2$, the device may dynamically reconfigure the panel to a circular pixel shape 625 in which a subset of the pixels are interconnected.

In some embodiments, both pixel size and shape may be dynamically reconfigured as the proximity of object 620 to panel 600 changes.

Figure 7:
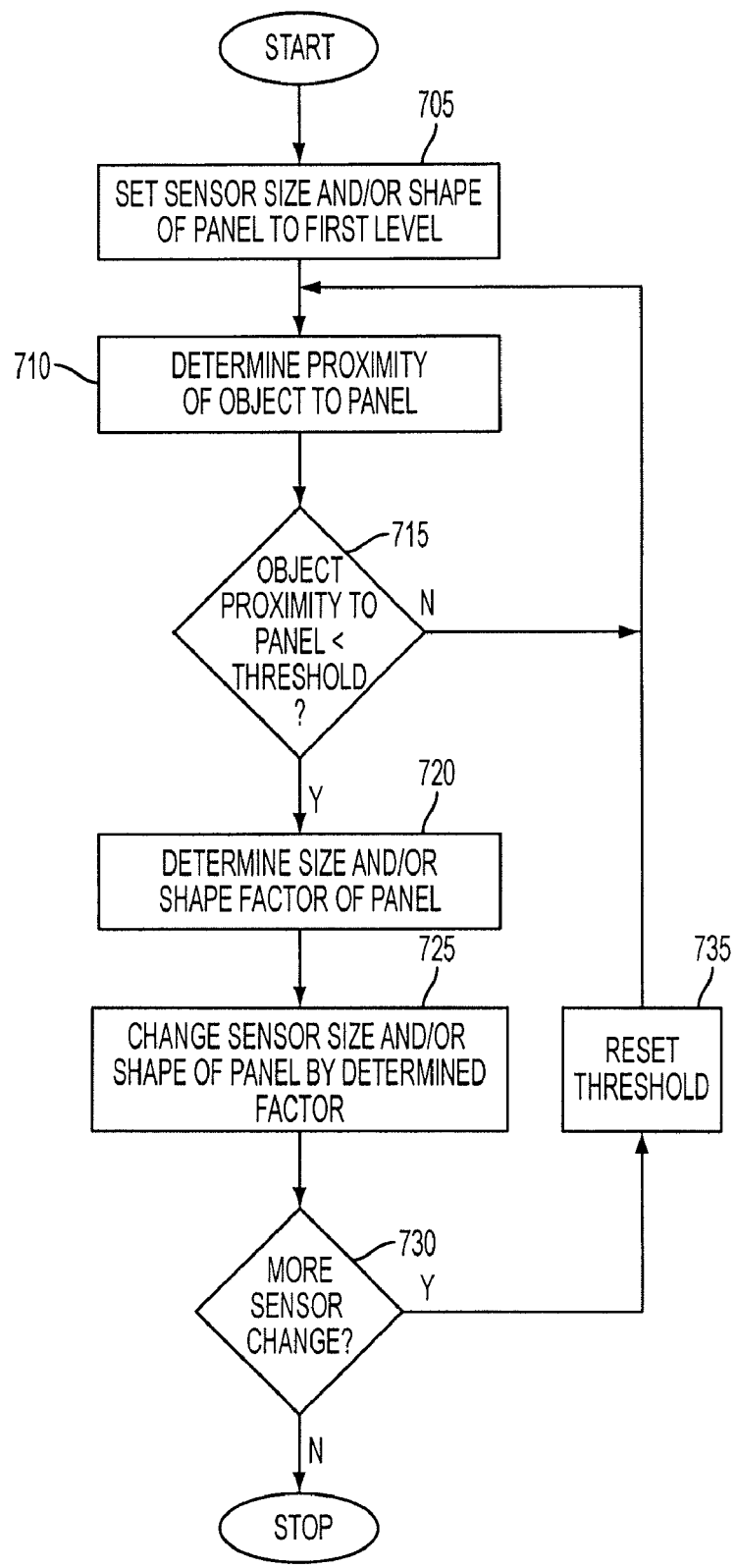
FIG. 7 illustrates an exemplary method for dynamically reconfiguring sensor size and shape of a sensor panel according to a predetermined factor based on an object's proximity to the panel according to embodiments of the invention.

FIG. 7 illustrates an exemplary method for dynamically reconfiguring sensor size and shape of a sensor panel according to a predetermined factor based on an object's proximity to the panel according to embodiments of the invention. Initially, a device having a sensor panel with dynamically reconfigurable sensor size and shape may adjust the sensing pixels to a first size and/or shape (705). The first size may be the maximum defined size of the panel where all of the pixels are interconnected. Alternatively, the first size may be any large size that is still able to detect the presence of an object. The first shape may be any shape that is able to detect the presence of an object. When the pixels sense an object, the device may determine the proximity of the object to the panel based on the pixel signals (710). The device may compare the determined proximity with a predetermined proximity threshold (715). If the object is not yet at a proximity that approximately matches the threshold, the device may continue to monitor the object's proximity to the panel (710, 715).

However, if the object is at or below that threshold, the device may determine a size factor by which to subdivide the pixels to form a smaller size (720). The factor may be a predetermined value stored in memory, e.g., a multiple of an integer such as 2 or 3. Alternatively, the factor may be a function of proximity and calculated therefrom. The device may dynamically subdivide the pixels by the determined factor to form a plurality of pixel subgroups (725). The number of subgroups may be the same as the value of the factor. All the pixels in a subgroup may be interconnected. The device may determine whether further size adjustment is needed (730). Further size adjustment may not be needed if the object has reached a proximity to the panel at or below the minimum predetermined proximity threshold. Further adjustment may also not be needed if the panel has reached its minimum defined size. Further adjustment may not be needed if an application currently executing does not require it. Or further adjustment may not be needed if the user so indicates. If further size adjustment is not needed, the method may stop.

Alternatively, if the object is at or below the threshold, the device may determine a shape factor according to which to adjust the pixels to form a different shape (720). The factor may be a predetermined shape stored in memory, e.g., a square, a circle, an oval, etc. Alternatively, the factor may be a function of proximity and determined therefrom. The device may dynamically reconfigure the pixels according to the determined factor to form the desired shape (725). The device may determine whether further shape adjustment is needed (730). Further shape adjustment may not be needed for the same reasons as those described above regarding size adjustment.

However, if further size and/or shape adjustment is needed, the device may recursively reconfigure the size and/or shape of the pixels according to this method. To do so, the device may reset the predetermined proximity threshold to a new predetermined threshold that is closer to the panel (735). The device may determine the object's proximity to the panel and compare the object's proximity to the new threshold. Optionally, the device may also reset the predetermined factor to a different value. When the device decreases the pixel size, the device may dynamically subdivide each of the preceding formed subgroups of pixels by the predetermined size factor to form new smaller pixel subgroups until no further size adjustment may be needed. Alternatively, when the device adjusts the pixel shape, the device may dynamically adjust the preceding shape of pixels according to the predetermined shape factor to form new shapes until no further shape adjustment may be needed.

Figure 8A:
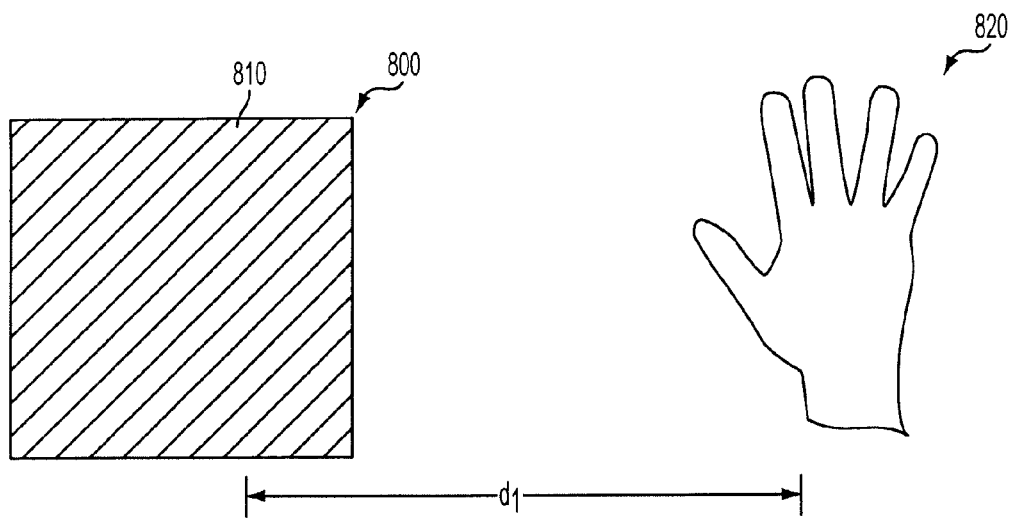
FIGS. 8a, 8b, 8c, 8d, and 8e are exemplary illustrations of a sensor panel having dynamically reconfigurable sensor size and shape according to a predetermined factor based on an object's proximity to the panel according to embodiments of the invention.

FIGS. 8a, 8b, 8c, 8d, and 8e are exemplary illustrations of a sensor panel having dynamically reconfigurable sensor size and shape according to a predetermined factor based on an object's proximity to the panel according to embodiments of the invention. FIGS. 8a, 8b, 8c, 8d, and 8e illustrate the method of FIG. 7. In FIG. 8a, sensor panel 800 of a device may have a larger pixel size and square shape 810 in which all of the pixels are interconnected. Object 820, e.g., a hand, may be a distance $d_1$ from sensor panel 800. As object 820 approaches panel 800, as some point, the panel may detect the object. When panel 800 detects object 820, the device may determine the object's proximity to the panel and continue to do so as the object approaches. The device may compare the object's proximity to a predetermined proximity threshold.

Figure 8B:
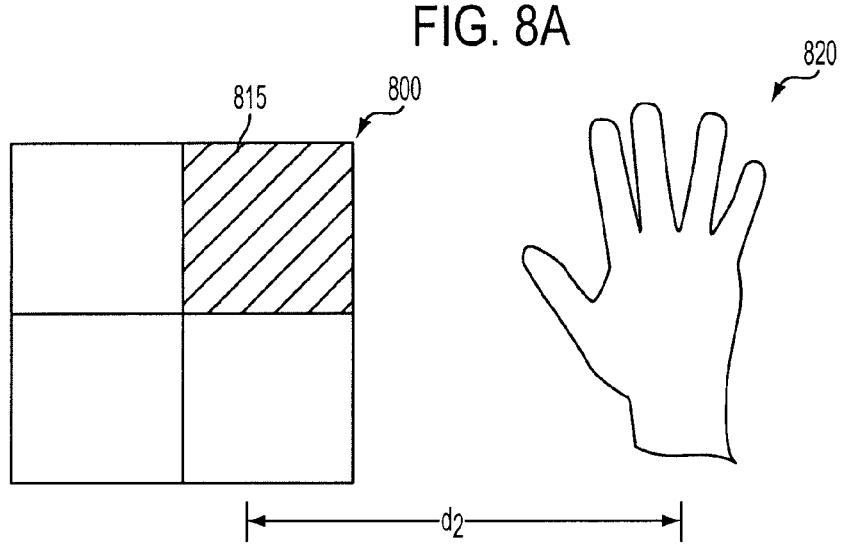

Suppose a distance $d_2$ is the predetermined proximity threshold, where $d_2<d_1$. In FIG. 8b, when object 820 reaches a proximity to panel 800 that approximately matches the threshold, the device may subdivide the pixels by a predetermined size factor. The predetermined factor may be any integer. Here, the predetermined factor is four, such that the panel may form four pixel subgroups. Hence, panel 800 may have a smaller pixel size 815 by a factor of 4. All the pixels in a subgroup may be interconnected to form a single pixel.

Figure 8C:
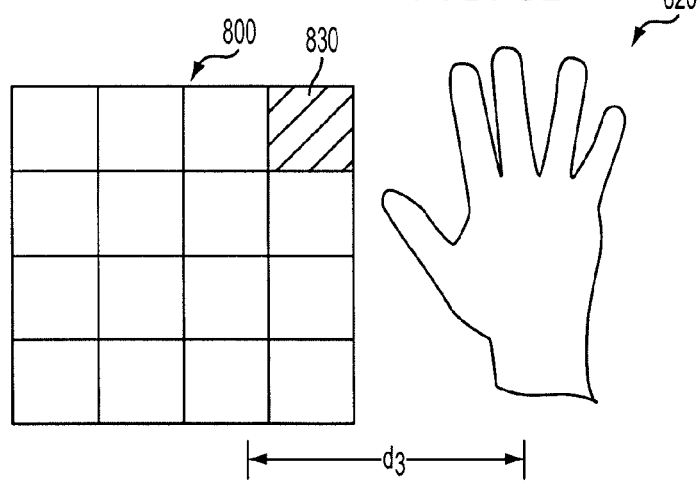

Suppose the device determines that further pixel size adjustment is needed. The device may reset the predetermined proximity threshold to a lower distance value, such as $d_3$ where $d_3<d_2$. In FIG. 8c, when object 820 reaches a proximity to panel 800 that approximately matches the resetted threshold, the device may subdivide the pixels in each subgroup by the predetermined size factor. Here, the predetermined factor is unchanged at four, such that each subgroup may be subdivided into four new subgroups making a total of sixteen subgroups. Hence, panel 800 may have a smaller pixel size 820 by a factor of 4. All the pixels in a subgroup may be interconnected to form a single pixel.

Figure 8D:
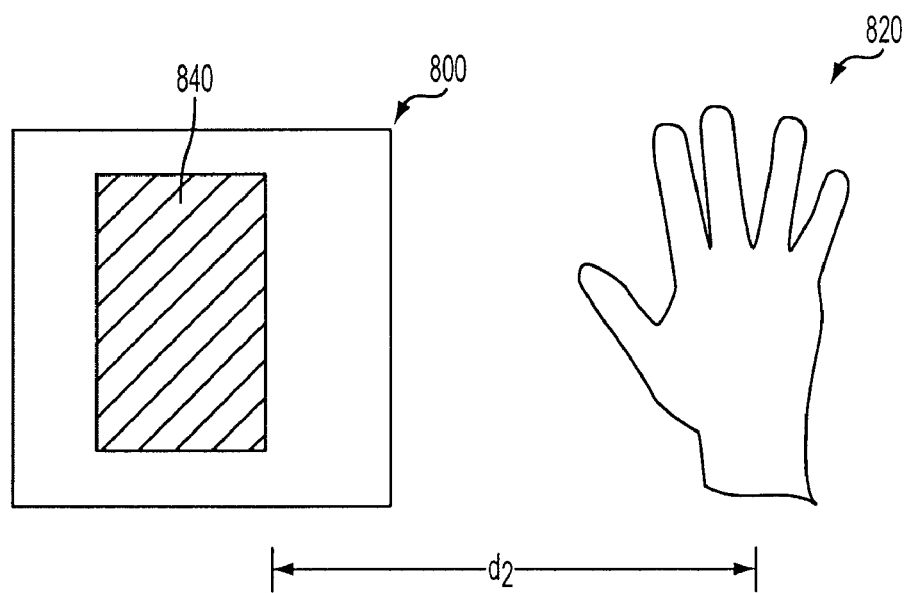
Figure 8E:
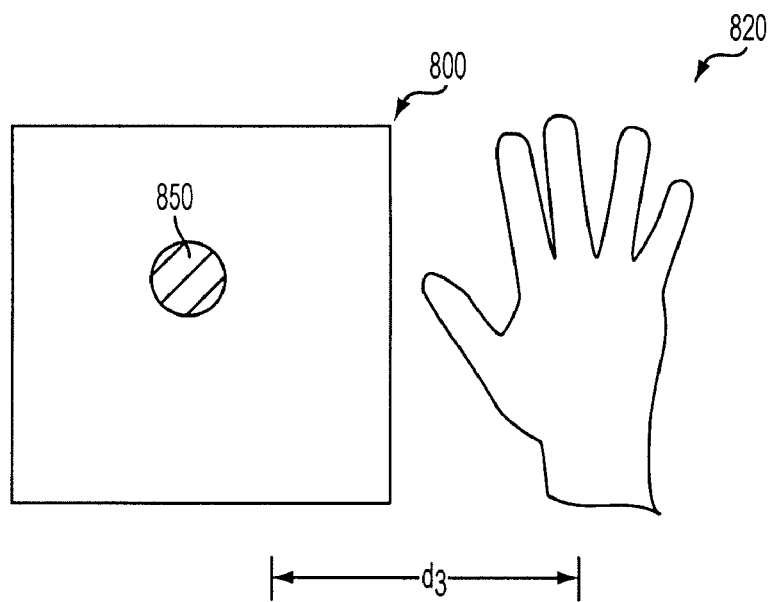

Alternatively, in FIG. 8d, when object 820 reaches a proximity to panel 800 that approximately matches the threshold $d_2$, the device may dynamically reconfigure the pixels according to a predetermined shape factor. Here, the predetermined shape factor is a rectangle. Hence, panel 800 may have a rectangular pixel shape 840. All the pixels within the rectangle may be interconnected to form a single pixel. In FIG. 8e, when object 820 reaches a proximity to panel 800 that matches the resetted threshold $d_3$, the device may dynamically reconfigure the pixels according to a predetermined shape factor. Here, the predetermined shape factor is a circle. Hence, panel 800 may have a circular pixel shape 850. All the pixels within the circle may be interconnected to form a single pixel.

In some embodiments, both pixel size and shape may be dynamically reconfigured as the proximity of object 820 to panel 800 changes.

Figure 9:
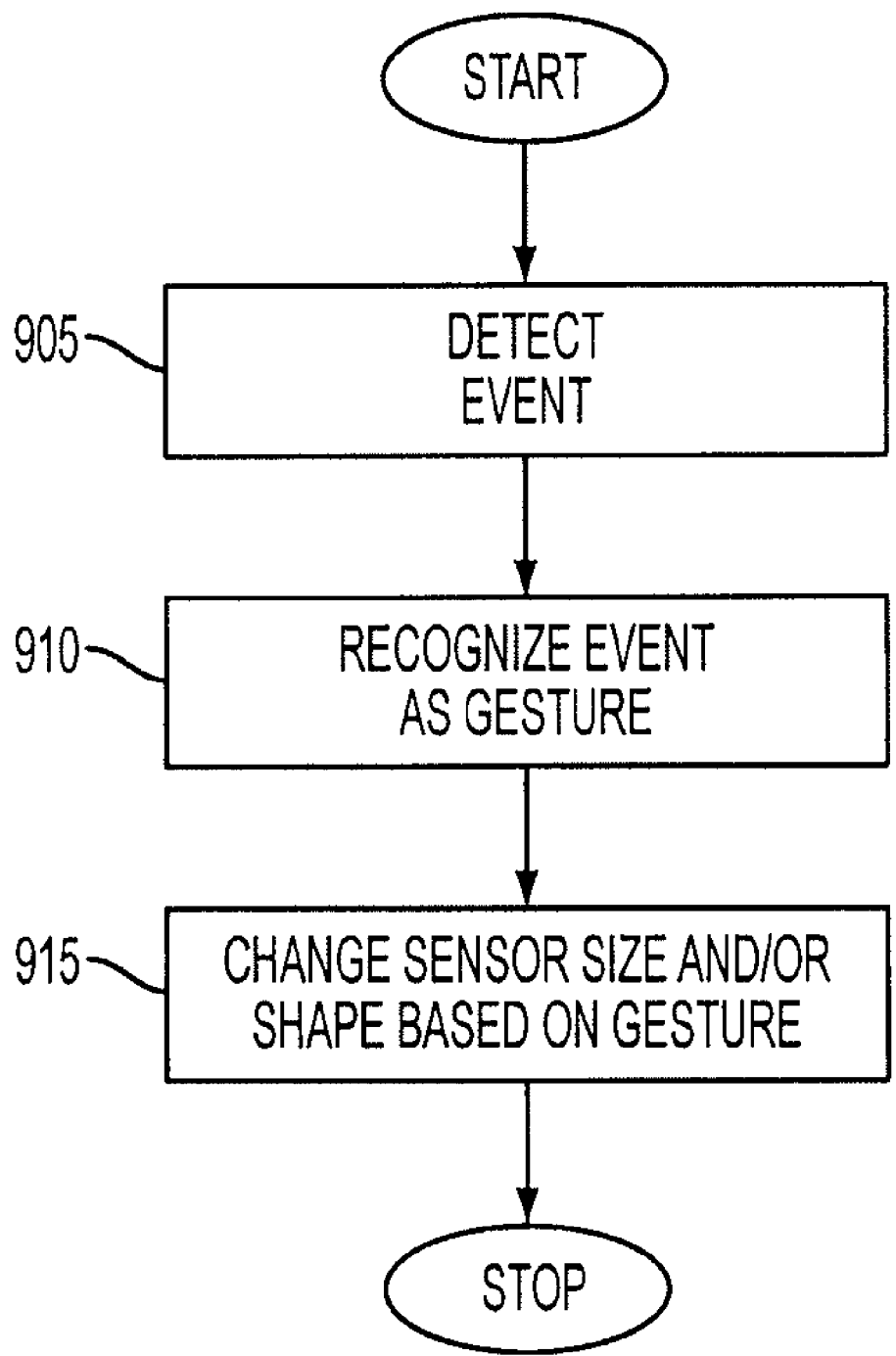
FIG. 9 illustrates an exemplary method for dynamically reconfiguring sensor size and shape of a sensor panel based on a gesture detected by the panel according to embodiments of the invention.

FIG. 9 illustrates an exemplary method for dynamically reconfiguring sensor size and shape of a sensor panel based on a gesture detected by the panel according to embodiments of the invention. Initially, a device having a sensor panel with dynamically reconfigurable sensor size and shape may adjust the sensing pixels to a certain size and/or shape. The size and/or shape may be any size and/or shape sufficient to detect the presence of an object. The panel may sense a touch or proximity event, i.e., an object may be either touching or proximate to the panel (905). The device may recognize the event as a gesture using any known gesture recognition technique (910). Based upon recognized characteristics of the gesture, the device may dynamically adjust the initial pixel size and/or shape (915). Examples of gesture characteristics that may be recognized include a hand or finger motion, position, and velocity perpendicular or parallel to the panel.

To adjust the pixel size and/or shape, the panel may select a particular portion of the panel in which to adjust the size and/or shape. The portion may be the entire panel or any portion of the panel, such as the portion in which the event is sensed. The device may adjust the pixel size and/or shape in the selected portion based on the recognized gesture characteristic. For example, the device may decrease the pixel size as the hand or finger position gets closer to the panel in order to detect where the hand or finger is targeting the panel. The device may decrease the pixel size as the hand or finger motion becomes more complex in order to correctly recognize what the gesture is. The device may decrease the pixel size as the hand or finger velocity increases in order to correctly track the gesture. Alternatively, the device may increase the pixel size for these characteristics if it is appropriate to do so. The device may change the pixel shape if the hand or finger position is limited to only a specific portion of the panel. The device may change the pixel shape if the hand or finger motion makes a certain shape. The device may change the pixel shape if the hand or finger velocity changes.

Figure 10A:
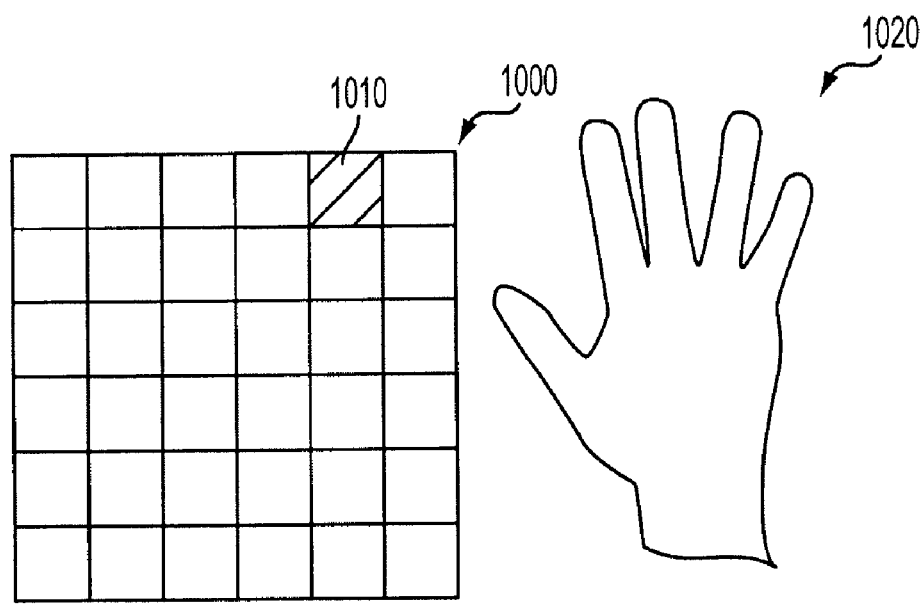
FIGS. 10a and 10b are exemplary illustrations of a sensor panel having dynamically reconfigurable sensor size and shape based on a gesture detected by the panel according to embodiments of the invention.
Figure 10B:
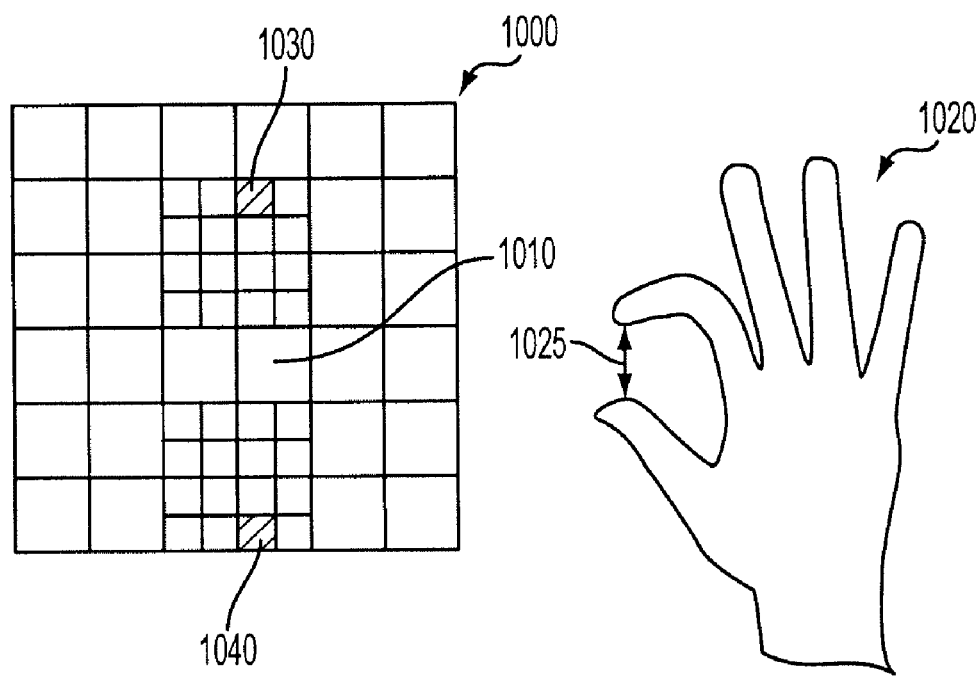

FIGS. 10a and 10b are exemplary illustrations of a sensor panel having dynamically reconfigurable sensor size and shape based on a gesture detected by the panel according to embodiments of the invention. FIGS. 10a and 10b illustrate the method of FIG. 9. In FIG. 10a, sensor panel 1000 may have an initial pixel size 1010. Hand 1020 may be proximate to panel 1000. In FIG. 10b, hand 1020 may perform a pinching gesture 1025 in which the thumb and forefinger move together. Sensor panel 1000 may sense hand 1020 as a proximity event. The device having sensor panel 1000 may recognize pinching gesture 1025. The device may determine that only certain portions of panel 1000 need be adjusted to have a different pixel size corresponding to the estimated positions of the thumb and forefinger performing the gesture. Therefore, the device may decrease pixel sizes 1030 and 1040 in selected portions of panel 1000. Pixel sizes 1030 and 1040 may be the same or different.

In this example, the pixel shape is unchanged. However, in some embodiments, the pixel shape may be dynamically reconfigured to better detect the pinching gesture, for example.

Figure 11:
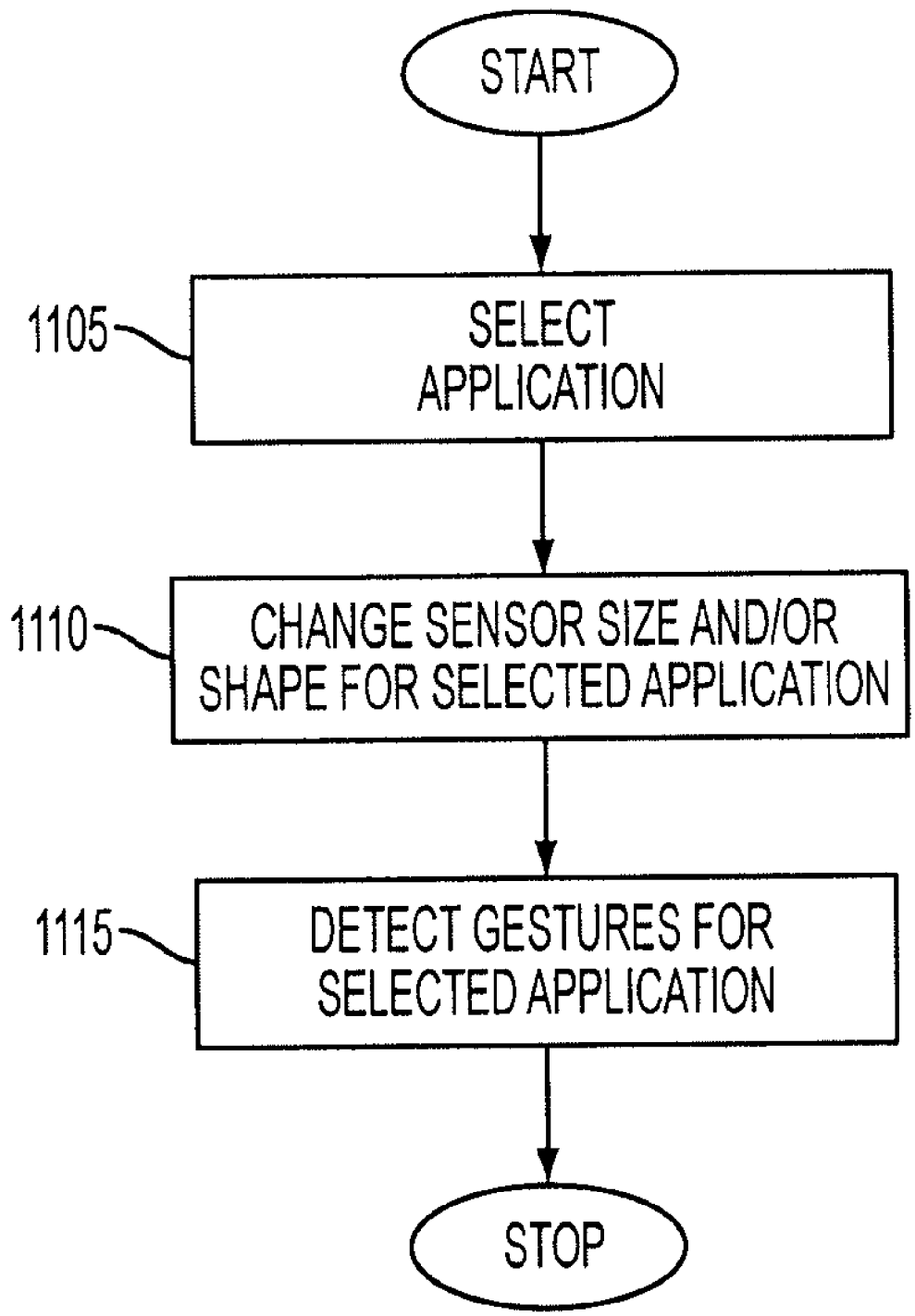
FIG. 11 illustrates an exemplary method for dynamically reconfiguring sensor size and shape of a sensor panel based on an application according to embodiments of the invention.

FIG. 11 illustrates an exemplary method for dynamically reconfiguring sensor size and shape of a sensor panel based on an application according to embodiments of the invention. Initially, a device having a sensor panel with dynamically reconfigurable sensor size and shape may adjust the sensing pixels to a default size and/or shape. The size and/or shape may be any size and/or shape sufficient to detect the presence of an object. The device may select an application to execute on the device (1105). The application may have functions which require certain gestures from a user in order to successfully interact with the application. Accordingly, the device may dynamically reconfigure the pixel size and/or shape of the panel for the selected application based on the expected gestures (1110).

To adjust the pixel size and/or shape, the panel may select particular portions of the panel in which to adjust the pixel size and/or shape. The portion may be the entire panel or any portion of the panel, such as the portion in which certain gestures are expected for the application. The device may adjust the pixel size and/or shape in the selected portion based on the application. The device may detect gestures (1115).

Figure 12A:
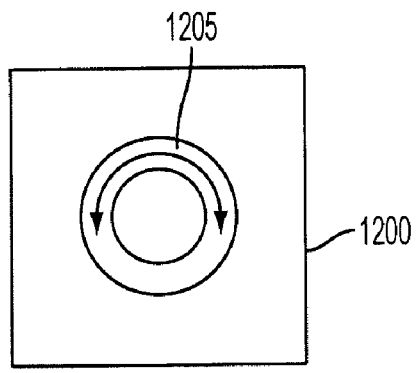
FIGS. 12a, 12b, and 12c are exemplary illustrations of a sensor panel having dynamically reconfigurable sensor size and shape based on an application according to embodiments of the invention.
Figure 12B:
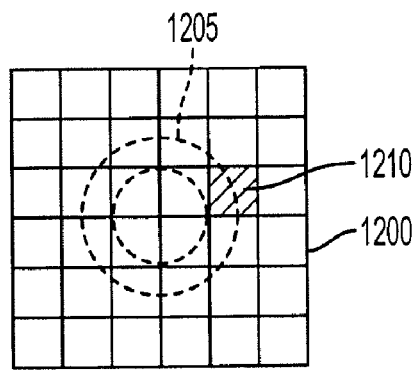
Figure 12C:
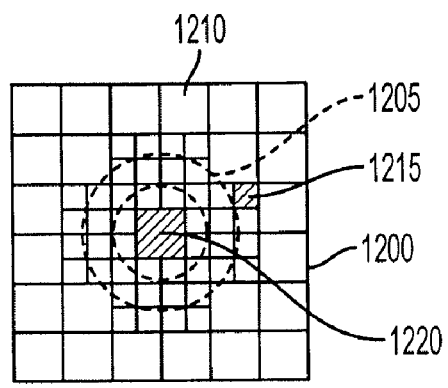

FIGS. 12a, 12b, and 12c are exemplary illustrations of a sensor panel dynamically reconfiguring sensor size and shape based on an application according to embodiments of the invention. FIGS. 12a, 12b, and 12c illustrate the method of FIG. 11. FIG. 12a shows an audio player application selected to execute on a device having sensor panel 1200. Icon 1205 may be displayed on panel 1200 to depict a scroll wheel. The application may require that an object select icon 1205 and perform a curving gesture parallel to panel 1200 in the vicinity of the icon in order to request rotation of the scroll wheel. FIG. 12b shows an initial pixel size and shape 1210 of panel 1200 and where icon 1205 would appear when the audio player application is selected. FIG. 12c shows smaller pixel size 1215 of panel 1200 where icon 1250 appears after the audio player application has been selected for execution. Here, pixel size 1210 may be decreased to smaller pixel size 1215 in the portion of the panel where the wheel portion of icon 1205 appears in order to detect the required curving gesture for rotating the scroll wheel. Pixel size 1210 may be increased to larger pixel size 1220 in the portion of the panel where the center of icon 1205 appears because the required curving gesture for rotating the scroll wheel is not expected in this portion of icon 1205. Pixel size 1210 may remain the same in the portions of the panel where icon 1205 does not appear because gestures may not be expected in these portions when the audio player application is executing.

In this example, the pixel shape is unchanged. However, in some embodiments, the pixel shape may be dynamically reconfigured to better detect the curving gesture, for example.

In another example, a menu pop-up application may require an object to select an item from the pop-up menu. This can require increasingly smaller pixel size as the object approaches the portion of the panel displaying the pop-up menu in order to sense when the object selects a particular menu item. This may also require a pixel shape corresponding to the display area of the pop-up menu.

In another example, a mouse rollover application may require an object to move around like a mouse input device. This can require a larger pixel size because it may not be necessary for the object to target a particular pixel, but a general area, such that the panel need not sense where the object may be targeting with high precision. This can also require a pixel shape capable of sensing the mouse rollover motion.

In another example, a computer wake-up application may require an object to make a motion indicative of a wake-up request. This can require a larger pixel size because sensing only a general or simple motion of the object may be required to recognize a wake-up request. This can also require a pixel shape capable of sensing the wake-up motion.

In another example, an interactive game application may require multiple interactions with an object. This can require multiple pixel sizes of the panel at the same time or in sequence. For example, in a first portion of the panel, the application may require the object to select a start or stop button. In a second portion of the panel, the application may require the object to simulate a complex motion, e.g., a driving motion, a batting motion, or a drawing motion. In a third portion of the panel, the application may require the object to manipulate more complicated icons, buttons, or sliders. This can require a large pixel size in the first portion, a small pixel size in the second portion, and medium pixel size in the third portion, for example. This can also require multiple pixel shapes corresponding to the different interactions.

Figure 13A:
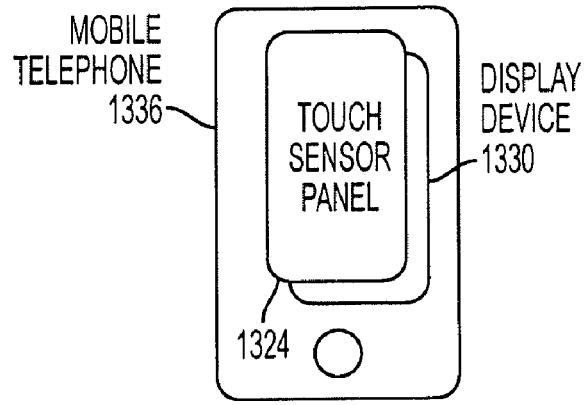
FIG. 13a illustrates an exemplary mobile telephone having a sensor panel that dynamically reconfigures sensor size and shape according to embodiments of the invention.

FIG. 13*a* illustrates exemplary mobile telephone 1336 that can include touch sensor panel 1324 and display device 1330, the touch sensor panel having dynamically reconfigurable sensor size and shape according to embodiments of the invention.

Figure 13B:
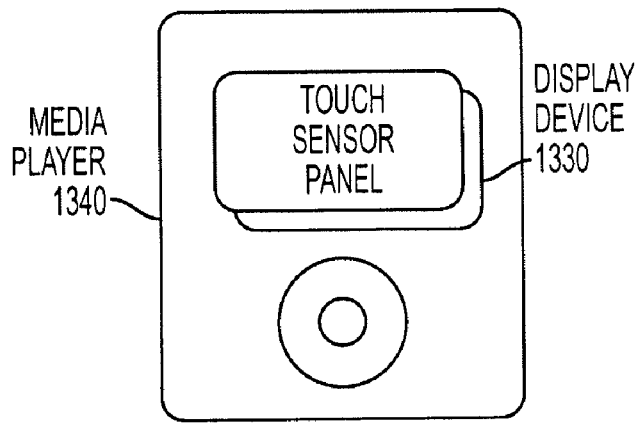
FIG. 13b illustrates an exemplary media player having a sensor panel that dynamically reconfigures sensor size and shape according to embodiments of the invention.

FIG. 13*b* illustrates exemplary digital media player 1340 that can include touch sensor panel 1324 and display device 1330, the touch sensor panel having dynamically reconfigurable sensor size and shape according to embodiments of the invention.

Figure 13C:
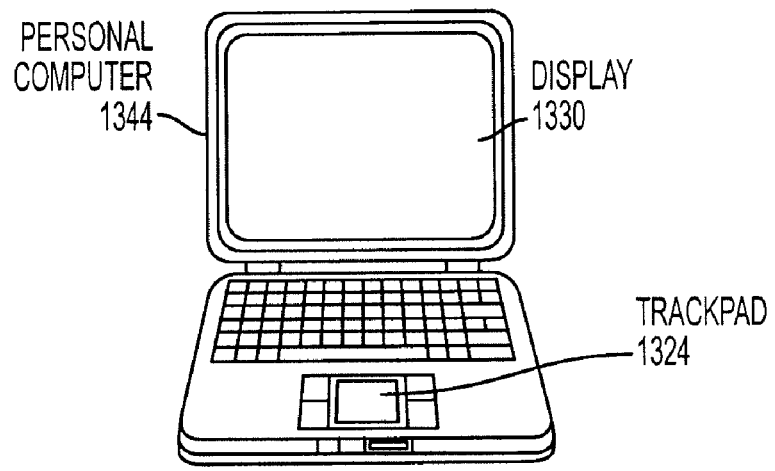
FIG. 13c illustrates an exemplary computer having a sensor panel that dynamically reconfigures sensor size and shape according to embodiments of the invention.

FIG. 13*c* illustrates exemplary personal computer 1344 that can include touch sensor panel (trackpad) 1324 and display 1330, the touch sensor panel and/or display of the personal computer (in embodiments where the display is part of a touch screen) having dynamically reconfigurable sensor size and shape according to embodiments of the invention.

The mobile telephone, media player, and personal computer of FIGS. 13*a*, 13*b* and 13*c* can provide improved gesture detection by dynamically reconfiguring sensor size and shape in sensor panels according to embodiments of the invention.

Generally, embodiments of the invention can be applicable to any devices that include sensor panels. The sensor panels can be, for example, single-touch panels, multi-touch panels, far-field proximity panels, near-field proximity panels, and combinations thereof. Single-touch panels may sense a single touch or proximity event at a time. Multi-touch panels may sense multiple touch or proximity events at a time. Far-field and near-field proximity panels may sense either a single or multiple touch or proximity events at a time.

Although the invention has been fully described in connection with embodiments thereof with reference to the accompanying drawings, it is to be noted that various changes and modifications will become apparent to those skilled in the art. Such changes and modifications are to be understood as being included within the scope of the invention as defined by the appended claims.

What is claimed is:

1. A method for dynamically reconfiguring at least one of the sensor size or shape in a sensor panel, the sensor panel including a plurality of sensing pixels placed along the panel at a predetermined initial size and shape, the method comprising:

determining that proximity of an object to the panel is below a predetermined distance; and dynamically reconfiguring at least one of the size or shape of the pixels according to a predetermined factor based on the determined proximity to form a plurality of subgroups of pixels, wherein reconfiguring the size or shape of the pixels includes coupling two or more rows or two or more columns of the sensor panel.

2. The method of claim 1, wherein the determining comprises:

based on signals from the pixels, estimating the proximity of the object to the panel; and comparing the estimated proximity to the predetermined distance.

3. The method of claim 1, further comprising:

recursively, until a predetermined condition is met, resetting the predetermined distance to a predetermined distance closer to the panel;

determining that the proximity of the object to the panel is below the reset predetermined distance; and dynamically decreasing the size of the previously formed plurality of subgroups of pixels by the predetermined factor to form a new plurality of subgroups of pixels.

4. The method of claim 3, wherein the predetermined condition is that the predetermined distance to the panel is at a minimum defined distance or that the size of the pixels has reached a minimum defined size.

5. A capacitive sensing device, comprising:

a plurality of capacitive sensing pixels; and a processor configured to:

set at least one of a size or shape of the pixels, in response to signals from the pixels, determine a parameter of an object detected by the signals, select a portion of the pixels that require at least one of a different size or shape based on the determined parameter, the portion including all the pixels or any portion thereof, and dynamically reconfigure the at least one of the size or shape of the selected portion of pixels to the at least one of the respective different size or shape based on the determined parameter, wherein reconfiguring the size or shape of the pixels includes coupling two or more rows or two or more columns of the sensor panel.

6. The device of claim 5, wherein the determined parameter includes at least one of a distance of the object from the device, a velocity of the object perpendicular to the device, a velocity of the object parallel to the device, and a direction of motion of the object with respect to the device.

7. A multi-touch sensor panel comprising:
a plurality of touch pixels; and
a region having at least one of a dynamically reconfigurable size or shape of touch pixels, the at least one of the size or shape being correlated with at least one characteristic of an object detectable by the panel,
wherein reconfiguring the size or shape of the pixels includes coupling two or more rows or two or more columns of the sensor panel.

8. The panel of claim 7, the panel further comprising:
a plurality of drive lines and a plurality of sense lines, an intersection of a drive line and a sense line defining a touch pixel.

9. The panel of claim 8, wherein the plurality of drive lines are laid in rows on the panel and the plurality of sense lines are laid in columns on the panel,
a group of the drive lines being interconnected,
a group of the sense lines being interconnected, and
the touch pixels defined by the groups being capacitively coupled to form a composite touch pixel, the composite touch pixel providing the region having the at least one of the size or shape.

10. The panel of claim 8, wherein the plurality of drive lines are laid in rows on the panel and the plurality of sense lines are laid in columns on the panel,
a first group of the sense lines being interconnected, and
a second group of the sense lines being interconnected,
the touch pixels defined by each of the groups being capacitively coupled to the drive lines to form a composite touch pixel, the composite touch pixel providing the region having the at least one of the size or shape.

11. The panel of claim 7, the panel further comprising:
a plurality of electrodes, an electrode defining a touch pixel.

12. The panel of claim 11, wherein the plurality of electrodes are laid in an array, the electrodes in the region being interconnected column-wise to form a composite electrode defining a composite touch pixel.

13. The panel of claim 11, wherein the plurality of electrodes are laid in an array, the electrodes in the region being interconnected row-wise to form a composite electrode defining a composite touch pixel.

14. The panel of claim 11, wherein the plurality of electrodes are laid in an array, the electrodes in the region being interconnected both column-wise and row-wise to form a composite loop electrode defining a composite touch pixel.

15. A computer, comprising:
a capacitive sensing panel comprising a plurality of capacitive sensing pixels placed along the panel at a predetermined initial size and shape;
a CPU connected to the panel; and
a memory comprising a software executable at the CPU, the software being configured to cause the CPU to
responsive to an object sensed by the panel, identify the portion of the panel that sensed the object, the portion including the entire panel or any portion thereof,
calculate a parameter associated with the object, and
dynamically reconfigure at least one of the size or shape of the pixels in at least the identified portion of the panel based on the calculated parameter,
wherein reconfiguring the size or shape of the pixels includes coupling two or more rows or two or more columns of the sensor panel.

* * * * *